H. J. DOYLE.
SUN SHIELD FOR AUTOMOBILES.
APPLICATION FILED JAN. 9, 1920.
1,372,492.
Patented Mar. 22, 1921.
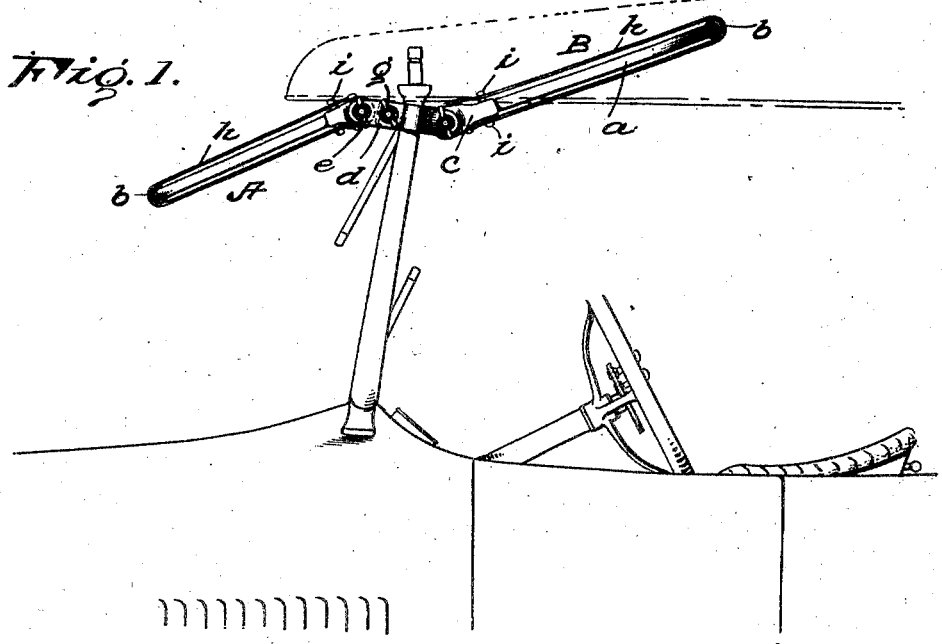
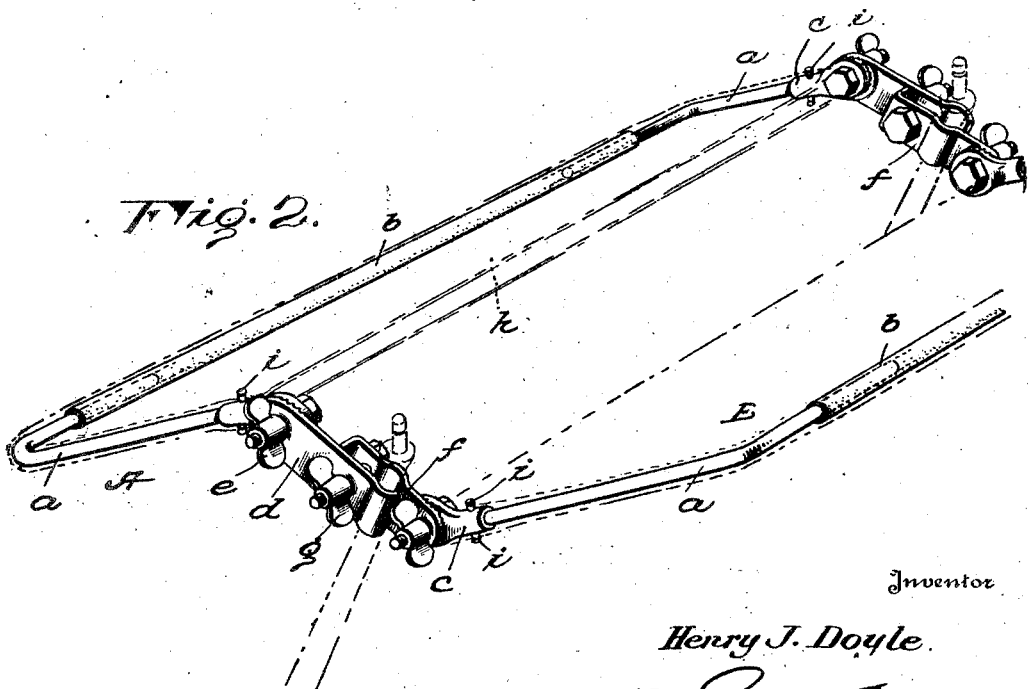
Inventor
Henry J. Doyle
By
his Attorneys

UNITED STATES PATENT OFFICE.

HENRY J. DOYLE, OF LYNDHURST, NEW JERSEY.

SUN-SHIELD FOR AUTOMOBILES.

1,372,492.	Specification of Letters Patent.	Patented Mar. 22, 1921.

Application filed January 9, 1920. Serial No. 350,284.

*To all whom it may concern:*

Be it known that I, HENRY J. DOYLE, of Lyndhurst, in the county of Bergen and State of New Jersey, have invented certain new and useful Improvements in Sun-Shields for Automobiles; and I do hereby declare the following to be a full, clear, and exact description of the invention, such as will enable others skilled in the art to which it appertains to make and use the same.

My invention relates to sun-shields for automobiles, and the object of the invention is to provide an improved and simple shield which may be readily attached to the supporting frame of the wind-shield, the parts of the shield being easily manipulated and without interference with the normal usage of the wind-shield.

A further object is to provide a sun-shield which may be extended or contracted as to width to fit the frame of a wind-shield.

In the drawings, Figure 1 shows a portion of an automobile with my sun-shield in position;
Fig. 2 is a view in perspective of the sun-shield, the fabric cover being indicated in dotted outline.

My improved shield includes two independently adjustable frames. That frame which projects to the front, and which I have designated A, comprises two angular corner pieces $a$ of steel or other metal and a connecting tube $b$ into the ends of which the alined ends of the corner pieces $a$ are frictionally fitted so as to permit extension or retraction of the angle pieces for varied widths. The other end of each angle piece has a socket connection with a plate $c$ one face of which is serrated and adapted to engage a similarly formed portion of a clamping bar $d$ these parts being firmly but adjustably gripped by a bolt and wing nut $e$. Bar $f$ is complementary to the bar $d$ and they together form the means for securing the shield to the frame of the wind-shield, a suitably bowed portion of each bar taking in the upright of the frame. The bars $d$ and $f$ are securely clamped to this upright by a bolt and wing nut $g$. The frame B extending to the rear of the wind-shield is of similar construction to frame A, its clamping connection being with the bar $f$. This frame is primarily adapted to protect the driver when the top of the automobile is not in use.

On each of the socket ends of the plates $c$ of both frames is an upstanding button $i$ to which the covering $h$ of the frame is secured. This cover is preferably made of oil cloth, or other material forming the top of the automobile, and is formed like a pocket to slip over the frame, the free edges being fastened by snap or other fasteners.

It will be seen that my improved sun-shield is readily applied to the frame of the ordinary wind-shield at or near the top thereof by simply opening up the clamping bars $d$ and $f$ and then securely binding them and the frame uprights by the bolt and nut screw $g$, the friction connection between the tubes $b$ and corner pieces $a$ permitting adjustment for width. The elevation of the frame is easily controlled by loosening and then tightening the screws holding the ends of the frames to the clamping bars.

My shield affords ample protection to the driver of a car from the glare of bright sunlight which is frequently blinding when beating on the glass of a wind-shield, and that portion of the shield extending to the rear gives shelter from the sun and also a measurable protection from light rains when the automobile top is down.

I claim as my invention:

1. In combination with the uprights of an automobile wind-shield, of pairs of clamping members secured to each upright at or near the upper extremity thereof, one part of one of the members projecting forwardly of the wind-shield and a complementary part projecting rearwardly of the wind-shield, and a pair of independently adjustable shields respectively supported by similarly projecting parts of each pair, to extend beyond said windshield in either or both directions.

2. In combination with the uprights of an automobile wind-shield, of pairs of clamping bars secured to each upright, one bar of each pair projecting forwardly of the windshield and the complementary bar projecting rearwardly of the wind-shield, all of said bars having a serrated portion, and a pair of independently adjustable shields respectively supported by similarly projecting bars of each pair, each of said shields including a frame formed of two angular corner pieces, one end of one corner piece being alined with the like end of the other and slidingly connected therewith, the other end of each corner piece terminating in a plate-like member having a serrated face adapted to be bound to the serrated portion of its supporting bar, and a cover fitted on said frame.

In testimony whereof I have signed this specification.

HENRY J. DOYLE.